US008685293B1

(12) United States Patent
Coppa et al.

(10) Patent No.: US 8,685,293 B1
(45) Date of Patent: Apr. 1, 2014

(54) CONTROL OF PARTICLE FORMATION AT THE NANOSCALE

(76) Inventors: Nicholas V. Coppa, Malvern, PA (US); Robert J. Levis, Rose Valley, PA (US)

( * ) Notice: Subject to any disclaimer, the term of this patent is extended or adjusted under 35 U.S.C. 154(b) by 203 days.

(21) Appl. No.: 13/053,119

(22) Filed: Mar. 21, 2011

Related U.S. Application Data

(60) Provisional application No. 61/315,409, filed on Mar. 19, 2010.

(51) Int. Cl.
*B29C 35/08* (2006.01)
*B29B 9/00* (2006.01)

(52) U.S. Cl.
USPC ............................. 264/5; 264/400; 264/406

(58) Field of Classification Search
None
See application file for complete search history.

(56) References Cited

U.S. PATENT DOCUMENTS

| 5,585,020 | A * | 12/1996 | Becker et al. | 219/121.85 |
|---|---|---|---|---|
| 2010/0072645 | A1 * | 3/2010 | Hiromatsu et al. | 264/21 |
| 2010/0301013 | A1 * | 12/2010 | Conneely et al. | 216/83 |
| 2011/0196044 | A1 * | 8/2011 | Hu et al. | 514/679 |

OTHER PUBLICATIONS

J. Heitmann, F. Muller, M. Zacharias, U. Gosele, Silicon Nanocrystals: Size MattersAdvanced Materials, 17, 795-803, 2005, Wiley-V C H Verlag GmbH, PO Box 10 11 61 00 D-69451, Weinheim, Germany.
S. Li, M. S. El-Shall, Synthesis of nanoparticles by reactive laser vaporization: silicon nanocrystals in polymers and properties of gallium and tungsten oxides, Applied Surface Science, 127-129, 330-338, 1998, Elsevier Science BV, PO Box 211 1000 AE, Amsterdam, Netherlands.
R. P. Camata, M. Hirasawa, K. Okuyama, K. Takeuchi, Observation of aerosol formation during laser ablation using a low-pressure differential mobility analyzer, Journal of Aerosol Science, 31, 391-401, 2000, Pergamon-Elsevier Science Ltd, The Boulevard Langford Lane, Kidlington Oxford, England.
H. Masuhara, T. Asahi, Y. Hosokawa, Laser nanochemistry, Pure Appl. Chem., 78, 2205-2226, 2006, Int Union Pure Applied Chemistry, 104 TW Alexander Dr PO Box 13757, Res Triangle Pk NC 27709-3757, USA.
S. Bililign, C. S. Feigerle, J. C. Miller, Inverse laser ablation: formation and chemistry of nanoparticles from gaseous precursors, Applied Surface Science, 127-129, 344-349, 1998, Elsevier Science BV, PO Box 211 1000 AE, Amsterdam, Netherlands.

(Continued)

*Primary Examiner* — Mary F Theisen

(57) ABSTRACT

Our invention allows for control of particle formation at the nanoscale, providing a means to control nanoparticle and nanostructure formation using feedback on the fly from nanoparticle characteristic analysis and optimization/knowledge extraction control algorithms. A closed loop feedback controller causes the interaction of a shaped flaser pulse with a substrate. The substrate can be one or more solid, liquid or gas or any combination thereof. Nanoparticles are produced and their characteristics are measured. The measured characteristics are compared with the desired nanoparticle characteristics. If the measured and desired characteristics are not equivalent, the closed loop feedback controller modifies the shape of the laser pulse and the next cycle begins. With successive loop of the control process the difference between the desired and measured characteristics converges until they are equivalent. At the end of the process a relationship is developed between the desired nanoparticle characteristics and the laser pulse shape. A catalog of all pulse shapes generated and the resulting nanoparticle characteristics is generated each time the processor is cycled whether or not the nanoparticle characteristics are those desired.

17 Claims, 5 Drawing Sheets

(56) References Cited

OTHER PUBLICATIONS

J. Pola, D. Pokorná, J. Subrt, P. Papagiannakopoulos, IR laser-induced co-decomposition of gaseous trisilane and carbon disulfide, Journal of Analytical and Applied Pyrolysis, 81, 231-236, 2008, Elsevier Science BV, PO Box 211 1000 AE, Amsterdam, Netherlands.

M. Guillermin, C. Liebig, F. Garrelie, R. Stoian, A. S. Loir, E. Audouard, Adaptive control of femtosecond laser ablation plasma emission, Applied Surface Science, 255, 5163-5166, 2009, Elsevier Science BV, PO Box 211 1000 AE, Amsterdam, Netherlands.

S. Singha, Z. Hu, R. J. Gordon, Ablation and plasma emission produced by dual femtosecond laser pulses, Journal of Applied Physics, 104, 2008, Amer Inst Physics, Circulation & Fulfillment Div 2 Huntington Quadrangle Ste 1 N O 1, Melville NY 11747-4501, USA.

L. Englert, M. Wollenhaupt, L. Haag, C. Sarpe-Tudoran, B. Rethfeld, T. Baumert, Material processing of dielectrics with temporally asymmetric shaped femtosecond laser pulses on the nanometer scale, Applied Physics A, 92, 749-753, 2008, Springer, 233 Spring St, New York NY 10013, USA.

R. J. Levis, H. A. Rabitz, Closing the Loop on Bond Selective Chemistry Using Tailored Strong Field Laser Pulses, Journal of Physical Chemistry, 106, 6427-6444, 2002, Amer Chemical Soc, 1155 16th St NW, Washington DC 20036, USA.

R. J. Levis, G. M. Menkir, H. Rabittz, Selective bond dissociation and rearrangement with optimally tailored strong-field laser pulses, Science, 292 (5517), 709-713, 2001, Amer Assoc Advancement Science, 1200 New York Ave NW, Washington DC 20005, USA.

C. Lupulescu, S. Vajda, A. Lindinger, A. Merli, L. Woste, Femtosecond investigations on the ultrafast photo-dissociation dynamics of CpMn(CO)(3) and its fragment ions, Physical Chemistry Chemical Physics, 6, 3420-3425, 2004, Royal Soc Chemistry, Thomas Graham House Science Park Milton Rd, Cambridge CB4 0WF, England.

D. Duval, S. Risbud, Semiconductor quantum dots: Progress in processing, Handbook of Nanostructured Materials and Nanotechnology, H. S. Nalwa, Ed., 1, 481-500, 2000, Academic Press, San Diego, USA.

\* cited by examiner

CONTROL OF PARTICLE FORMATION AT THE NANOSCALE

This application claims priority to Provisional patent application No. 61/315,409, filed Mar. 19, 2010.

BRIEF SUMMARY OF THE INVENTION

Our invention allows for control of particle formation at the nanoscale, providing a means to control nanoparticle and nanostructure formation using feedback on the fly from nanoparticle characteristic analysis and optimization/knowledge extraction control algorithms. This invention represents a new nanomaterials synthesis and knowledge development paradigm unlike any present nanomaterials or nanotechnology tool. Its use yields new materials concomitantly with important general knowledge for other nanomaterials development strategies.

A closed loop feedback controller causes the interaction of a shaped femtosecond (on the order of $10^{-15}$ to $10^{-13}$ s, "fs") laser pulse with a substrate. The substrate can be one or more solid, liquid or gas or any combination thereof. Nanoparticles are produced and their characteristics are measured. The measured characteristics are compared with the desired nanoparticle characteristics. If the measured and desired characteristics are not equivalent, the closed loop feedback controller modifies the shape of the laser pulse and the next cycle begins. With successive loop of the control process the difference between the desired and measured characteristics converges until they are equivalent. At the end of the process a relationship is developed between the desired nanoparticle characteristics and the laser pulse shape. A catalog of all pulse shapes generated and the resulting nanoparticle characteristics is generated each time the processor is cycled whether or not the nanoparticle characteristics are those desired. Such a database provides for the ability to look up the specific pulse shape that yields a particular type of nanoparticle.

The closed loop feedback controller typically comprises a laser and associated amplifier that produces high intensity fs laser pulses which are directed through the optical components of a laser pulse shaper. A Ti:sapphire laser can be used for this purpose but its mentioning here is not meant to restrict the practice of our invention to the its use; rather, it is mentioned to provide one skilled in the art an example of a laser/amplifier system capable of producing fs laser pulses of the type sufficient for the purposes of our invention. The pulse shaper output is directed to interact with a substrate to form nanoparticles. The characteristics which includes size of the nanoparticles are measured by one or more analyzers. The signals from the analyzers are read and interpreted by an algorithm which is running on a computer integral to the pulse shaper. The algorithm evaluates the data and compares it to the characteristics of the desired nanoparticles defined at the outset of the process. The algorithm reconfigures the pulse shaper so as to produce a new pulse shape. This process is cycled continuously until a pulse shape is found that yields nanoparticles having the desired characteristics. Once the desired nanoparticles are found to be produced, the tool can continuously generate nanoparticles with the desired characteristics by keeping constant the laser pulse shape for any duration to produce quantities of the desired quantity.

BACKGROUND OF THE INVENTION

1. Field of the Invention

The invention relates to methods for producing nanoparticles, including the form of nanopowders, more particularly to methods for using shaped femtosecond laser pulses to produce nanoparticles and furthermore particularly to methods for using closed loop control of shaped femtosecond laser pulses to produce nanoparticles.

2. Brief Description of the Related Art

Nanoparticles are components which generally are small sized, less than 500 nanometers (nm), or more commonly less than 100 nm. Our invention allows for the precision control of nanoparticle formation under closed loop control using shaped ultrafast laser pulses, as a new tool, for materials discovery. Further our invention allows for the precision control of nanoparticle formation under closed loop adaptive control using shaped ultrafast laser pulses, as a new tool, for nanomaterials discovery.

Our invention provides for the ability to derive knowledge of nanoparticle formation as a function of laser pulse shape by controlling the rate (intensity) and type (coherent or incoherent) of energy deposition.

Our invention allows for the control of matter at the nanoscale in reaction regimes far from equilibrium. The invention provides an ability to synthesize and concomitantly characterize the nanomaterials produced while developing correlations relating laser pulse shape, energy deposition, and substrate or reactant composition to nanoparticle product size, size distribution and composition which are developed from the data obtained during its operation.

Our invention represents a new paradigm in the ability to elucidate the relationship between control of molecular reactions at the nanoscale and the properties of materials produced. The chemistry of the reacting system is integral to the control processor. The complexity of the chemistry and the characteristics of the products it yields depends on the sophistication of the instrumentation providing feedback about the desired relevant properties. The processor, that is, the closed-loop control engine, has inherent open architecture in that any desired property is integrated into the control process so long as the instrumentation exists or can be developed to provide information to the control processor at the relevant time scale.

The literature abounds with methods for the production of nanoparticles. Duval, 2000 and Heitmann, 2005 give several examples of nanoparticle production. Nanoparticle manufacture methods include precipitation from a high temperature melt, low solubility in aqueous environments, limited solution of powders into a matrix, precipitation in controlled volumes where the pore structure of a matrix dictates the solution domain from which a nanoparticle is grown, metal organic chemical vapor deposition (MOCVD), laser ablation, lithography, heterogeneous deposition on surfaces, low pressure (LP)CVD, plasma enhanced (PE)CVD, and deposition initiated by defect structures among other techniques. Some examples of these methods are described in Lowndes, 1998 and Li, 1998. The several journals devoted to the science are a testimony to the emergence of size as an independent degree of freedom and the tremendous potential impact that mastery of control at the nanoscale will have on all aspects of our world.

The development of a generalized tool for the production of high precision nanoparticles where particle size is invariant or at least less than a fraction of a nanometer may be impossible where the principal driving forces are dependent on statistical processes. Clever gas phase and liquid or solution phase processes have been developed but all suffer from a lack of generality. Processing conditions for one narrow particle size and composition, once found using conventional techniques, does not logically extend to the formation of other sizes often due to a range of complex interactions including encroachment of boundaries, fluid effects, etc. Solution processes, in particular, additionally suffer from impurity, stoichiometry and concentration effects which may confound the development of the desired properties of the nanoparticle even though the desired shape and size are achieved. Solvent impurities tend to concentrate on or within the nanoparticle precursor during precipitation. While the concentration of the impurity within the nanoparticle may be insufficient to dominate its crystallization and growth behavior they may poison or wash-out the desired size-dependent attributes.

One key to controlling particle formation at the nanoscale is a means to transfer the system from one state, representing a particular atomic or molecular array (the gas phase, for instance), into another state representing the desired array of atoms (a nano cluster with 1000 atoms, for instance). In a time-averaged processing method, characterized by, for example temperature, the system is changed through the evolution of enumerable possible states to a new average. The timescale for this evolution is long in comparison to the life-time in any one (micro)state from which the system may evolve. Since all (micro)states contribute to the new time evolved average, precise control through thermal means may be impossible and products at the nanoscale, that is, assemblies of particles, must reflect the dispersion of (micro)states from which they evolved and into which they will ultimately fall. If the rate at which energy input occurs is faster than the transition of the system from one (micro)state to another there exists the possibility of driving the transition to and from a particular single state (free from statistical variations) into another while avoiding the evolution across (through) enumerable undesired states.

Perhaps with this idea in mind, many researchers have explored the use of lasers to affect the rapid deposition of energy into a system to affect such transitions. Further the use of femtosecond lasers has been more recently explored because energy is placed into the system on a time scale which is short compared to the time scale of energy partitioning into nuclear modes and plasma modes.

Laser ablation involves the interaction of intense laser light with a solid target resulting in the formation of an energetic plume to affect formation of a multitude of structures. This discussion focuses on its application to the formation of nanoparticles. There have been numerous reports regarding the use of longer duration (100-500 fs) laser pulses to induce nanostructure and nanoparticle formation. These reports employ the ultrafast deposition of energy to induce a phase change on a time scale that is short for energy diffusion from the interaction region to the bulk and short on the time scale for plasma formation. While the present invention also employs ultrashort laser pulses, including ones having a pulse duration of less than 100 fs, our invention is further distinguished by the use of laser pulse shaping and the control of said pulse shapes by a control algorithm to affect the control of particle size and particle size distribution.

Lasers of various pulse lengths have been used in the laboratory and on the commercial scale to drive chemical vapor deposition, laser-assisted chemical vapor condensation, laser pyrolysis and other methods. A significant number of experiments by the inventors has demonstrated that simple variables like temperature, pressure and reaction zone geometry could be used to control the size of particular nanoparticles. For instance, film versus particle formation is largely a function of the pressure of the reactor. At low pressure collisions can occur primarily with the walls to produce films and at high pressure collisions can occur with other atoms to produce particles. Nanoparticles produced using such methods are amongst the most monodisperse, but are still far from being truly monodisperse. True precision at the nanoscale is not achieved, rather, the precursor laden liquid or gaseous substrate is excited by the laser followed by rapid condensation prior to particle growth. Particle monodispersity is achieved purely by geometrical constraints of the reaction zone caused by confinement of the region of intense heating to a localized region in space. Condensation product particles traveling outward have little opportunity to collide prior to loosing sufficient energy so that particle coalescence is improbable (for example, see Camata, 2000).

Femtosecond duration laser pulses have been used to drive crystallization of proteins from a saturated solution (see Masuhara, 2006; Adachi, 2004). In inverse laser ablation, a laser is used to drive dissociation, ionization dissociation and plasma formation from a gas of molecules, followed by coalescence of these species to yield solid nanoparticles. However, no particle size control was affected (Bililign, 1998). This method employed a ps laser at a single wavelength impinging on a super sonic jet of iron carbonyl to produce iron nanoparticles. The super sonic jet was used to eliminate post photochemical collisions. Their efforts included use of the 266-nm fourth harmonic at a energy of 2-4 mJ. Their work demonstrated that CO could be systematically removed from the metal carbonyl and that $Fe_n$ clusters n=1, 2 . . . 7+ readily formed. Others used IR laser to irradiate trisilane in mixtures with "non-absorbing" carbon disulfide in the liquid phase. Their results showed that simultaneous decomposition of both compounds resulted in formation of Si/S/C/H polymer. They employed TEA $CO_2$ laser operating at 944.19 cm$^{-1}$ with a repetition frequency of 1 Hz and an energy of 1.2 J in a pulse to induce infrared multiphoton dissociation (see, Pola, 2008). None of the above methods employed the use of shaped laser pulses to affect or control particle size.

The area of shaped pulse interaction with solids is limited. One recent paper demonstrates that the amount of ion to neutral formation in Al desorption can be controlled using optical emission feedback. (see Guillermin, 2009). Work with dual fs laser pulses provided for the opportunity ablation from a two phase system. The first pulse caused melting and then the second pulse, which interacts with the liquid, strongly couples and leads to emission products unlike that of single shot work. (see Singha, 2008). That work did not employ shaped laser pulses nor did it derive control of size from the manipulation of the laser pulse shape. The nonlinear excitation possible with fs duration pulses has led to interesting observations in the processing of materials. In Englert, 2008, it was shown that nonlinear effects serve to create in solid substrates vaporization zones much smaller that the diffraction limited focal spot size when pulses have negative cubic chirp, but such use of shaped laser pulses was not employed to affect properties of the ejected mass, nor was the ejected mass characterized, nor was it known whether the ejected mass was composed of nanoparticles.

Our invention provides for nanoparticle formation control achieved through the use of a wide bandwidth extremely short shaped laser pulse. Work done by Levis (Levis, 2002) has shown that bond selective photochemistry of gas phase molecules is possible through powerful search algorithms and multi channel (256) control of the spectral composition of femtosecond laser pulses. In such experiments, the search algorithm directed the system to find the desired chemical event. The molecule and its fragments, in the case of time of flight mass spectroscopy, were a part of the computational process to find the desired solution. The particular laser pulse shape was referred to as a "photonic reagent" to convey the reaction concept: reactant molecule plus photonic reagent yields product molecule. This work did not teach the formation of nanoparticles from the molecular system. In our invention we employ a "substrate" and use a wide bandwidth fs shaped laser pulse to drive the substrate into a new state consisting of nanoparticles. We define a substrate as a solid, liquid or gas of simple or complex composition which when acted upon by a shaped fs laser pulse yields nanoparticles. Examples of a substrate of simple composition are single crystal or amorphous silicon surfaces, pre-activated molten silicon surface and silane. Many other types of substrates can be envisioned, and some examples are provided here. Substrates consisting of volatile metal compounds such as nickel carbonyl $Ni(CO)_4$, cobalt triacetylacetonate $Co(acac)3$, or tungsten hexafluoride $WF_6$ vapors yield metal nanoparticles of Ni, Co or W. Mixtures of metal carbonyls yield alloys corresponding to the composition of the said mixtures, for example $Ni(CO)_4$ and $Fe(CO)_5$ yield NiFe alloys. One embodiment of our invention allows for the shaped laser pulse excitation of an expanding gas jet to induce nanoparticle formation. Comparison of the control space to that of the resulting nanoparticle products serves as part of a comprehensive scheme to create knowledge. A natural consequence of our invention is the cataloging of laser pulse shapes and the nanopartide characteristics so produced. This then allowed for the production of nanoparticles of one variety or another through the selection of the appropriate photonic reagent and "substrate."

With the development of advanced instrumentation and computational methods the invention has further utility in the control of the production of materials with specific secondary and tertiary properties including for example, optical, magnetic and electrical (transport properties) and catalytic activity, adsorption, hardness and strength, among many other properties. That is nanoparticle formation control can be guided by the other properties that are dependent on the properties of the nanoparticle provided the requisite assay or characterization tool that provides information about the desired characteristics or properties can be incorporated into the feedback loop.

The area of photonic reagent driven chemical and physical processes has been widely investigated over the past 10 years (see Levis, 1995). Laser pulse shaping has proven invaluable for a range of experiments focused on controlling processes from high harmonic generation to biomolecule dissociation in the gas phase, but work in these disciplines has not addressed nanoparticle formation. Lupulescu, 2004 described work where an intense femtosecond pulse has been shown to fragment the majority of bonds in a gas phase molecule, such as a cyclopentyl metal carbonyl through multiphoton excitation, but that work neither described nor eluded to the possibility of nanoparticle formation.

Advances in laser pulse shaping technology, slaved to pattern recognition learning control systems, have opened opportunities for studying the dynamics and chemical manipulation of virtually any system that can be introduced into a closed-loop control apparatus (see Levis, 2002). Using this approach it is possible to tailor the control laser to manipulate molecular dynamics to affect the desired chemistry. The requirement of optimizing a desired product requires the ability for introducing an adjustable control field having sufficiently rich structure. Construction of such a field is currently possible in the laboratory using the technique of spatial light modulation in conjunction with an ultrafast laser pulse. As demonstrated here, the method of closed loop control for laser-induced processes offers a way of selecting the appropriate pulse shape needed for nanoparticle formation control without having detailed knowledge of the relationship between laser pulse shape and nanoparticle properties.

In closed loop operations, the substrate, the laser pulse shaper, and a pattern recognizing learning algorithm form the elements for repeated cyclic operation to teach the laser how to control reactivity and affect the generation of one product over another. Once a laser pulse shape is found that affects the desired nanoparticle product, that pulse can be used repetitiously to produce that product. Our invention enjoin elements of the molecular reaction control process (Levis; 2002), namely closed-loop operations with strong field laser control, with new characterization techniques to the affect precision control at the nanoscale so as to produce nanoparticles of desired size, shape and ultimately more advanced properties.

A general schematic of the closed loop control for shaped laser pulse-induced nanopowder formation process is shown in FIG. 1. In this process loop, the phase and amplitudes of the component frequencies of a fs pulse are the control variables, and the resulting nanoparticle average particle size and particle size distribution as ascertained using, for example, a differential mobility analyzer, the number of particles having different masses are the observables employed to evaluate the fitness of the pulse shape. Using the fitness information derived from trying a variety of laser pulses, the control algorithm then creates new or modified pulse shapes to try based on the patterns recognized from the evolving measured pulse-shape fitness relationship. Successive turns through the control loop ultimately leads to the finding of a pulse shape that produces the desired nanoparticle properties.

The present invention differs from other laser driven processes in that shaped, fs, laser pulses are used to produce nanoparticles, and that different laser pulse shapes are capable of producing nanoparticle size distributions of different average size and size distribution.

DETAILED DESCRIPTION OF THE INVENTION

Figure 1:
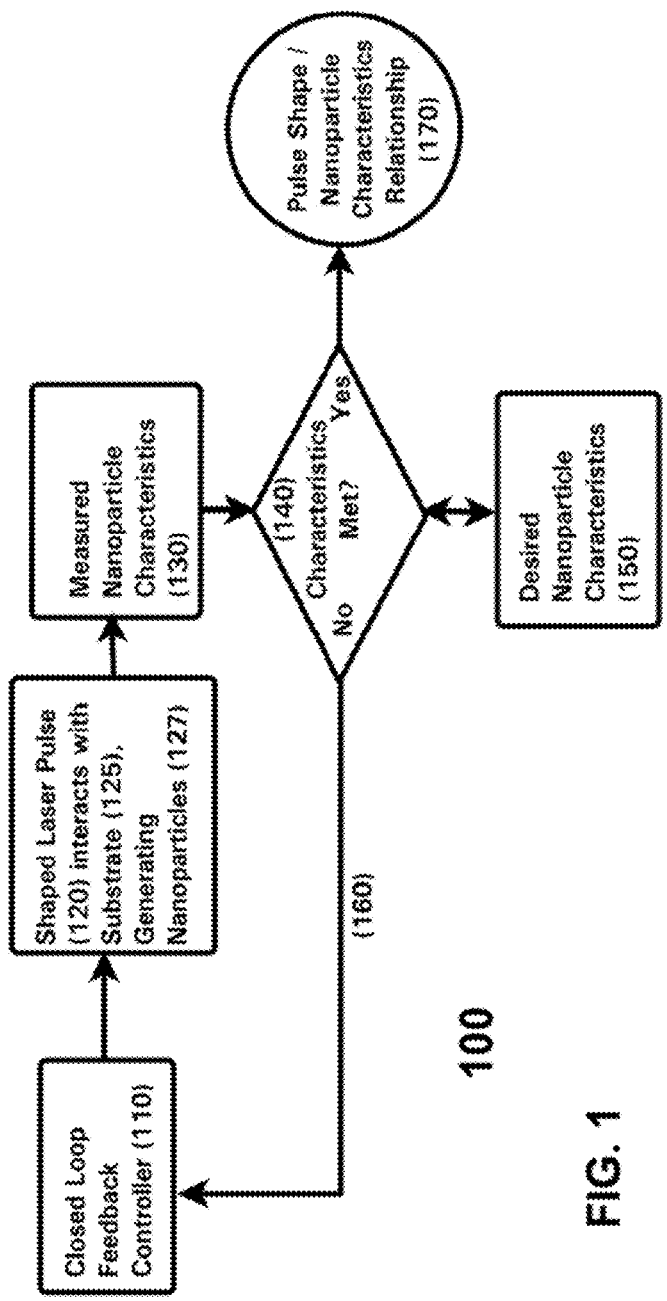
FIG. 1 A schematic diagram representing the method of our invention. Closed loop feedback controller drives the fs pulse shaper to yield shaped laser pulse which interacts with a substrate generating nanoparticles. The nanopartide characteristics are measured and compared with the desired nanopartide characteristics. If the measured and desired characteristics are not equivalent, the dosed loop feedback controller drives the pulse shaper with another (distinct) laser pulse shape and the process continues. When the measured nanoparticle characteristics meet the desired nanoparticle characteristics, the process has converged and the particular laser pulse shape that produces the desired nanoparticles characteristics is found. At the end of this convergence process using the particular laser pulse shape that yields the desired nanoparticle properties, the process can then be made to run continuously to produce desired nanoparticles of sufficient quantity using this solution.
Figure 2:
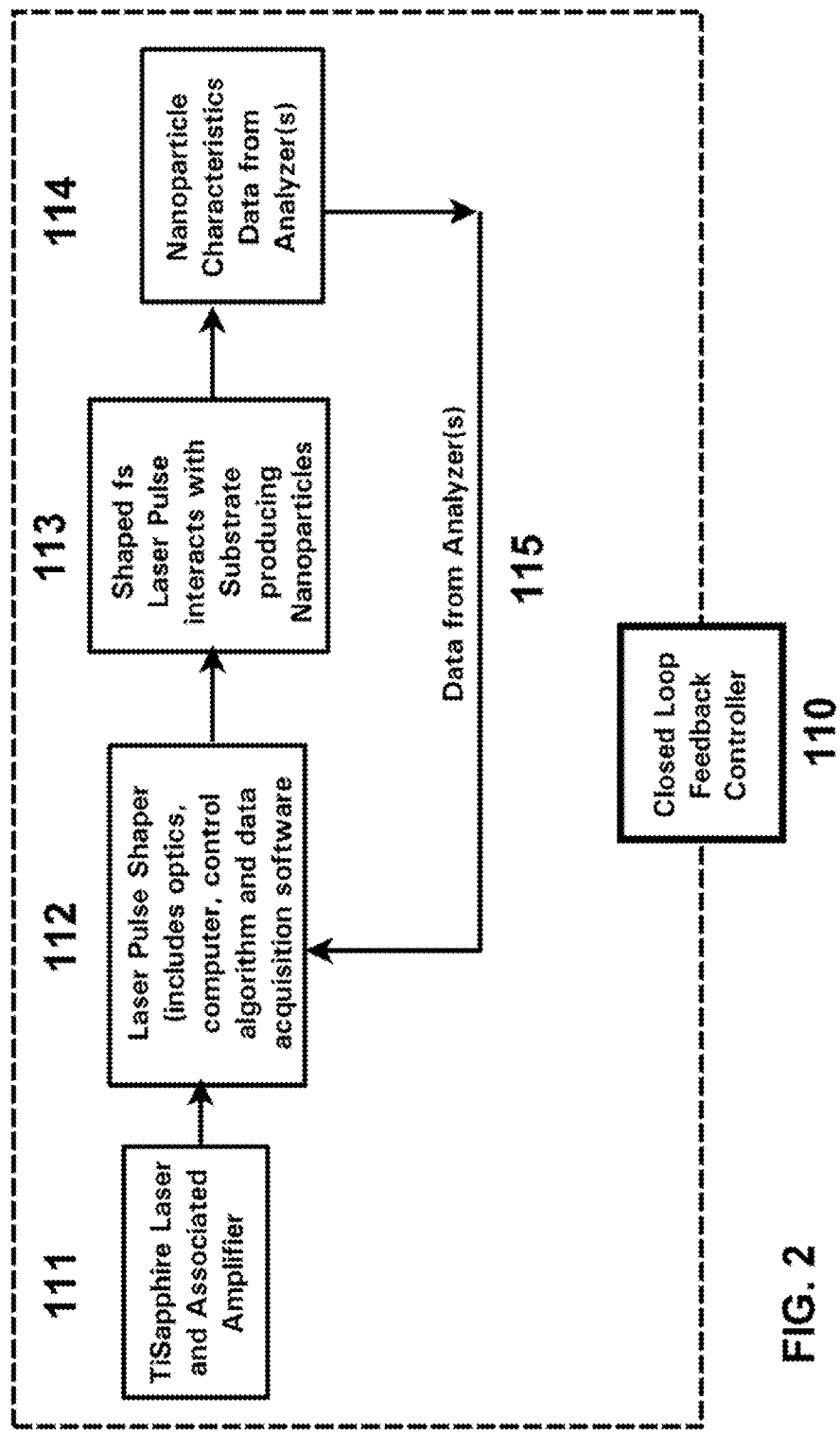
FIG. 2 Example of the details of the closed loop feedback controller: Ti:sapphire laser and associated amplifier laser pulse shaper, location where the laser pulse interacts with the substrate to form nanoparticles. One or more analyzers produce signals which are read and interpreted by an algorithm which is running on a computer integral to the pulse shaper.
Figure 3:
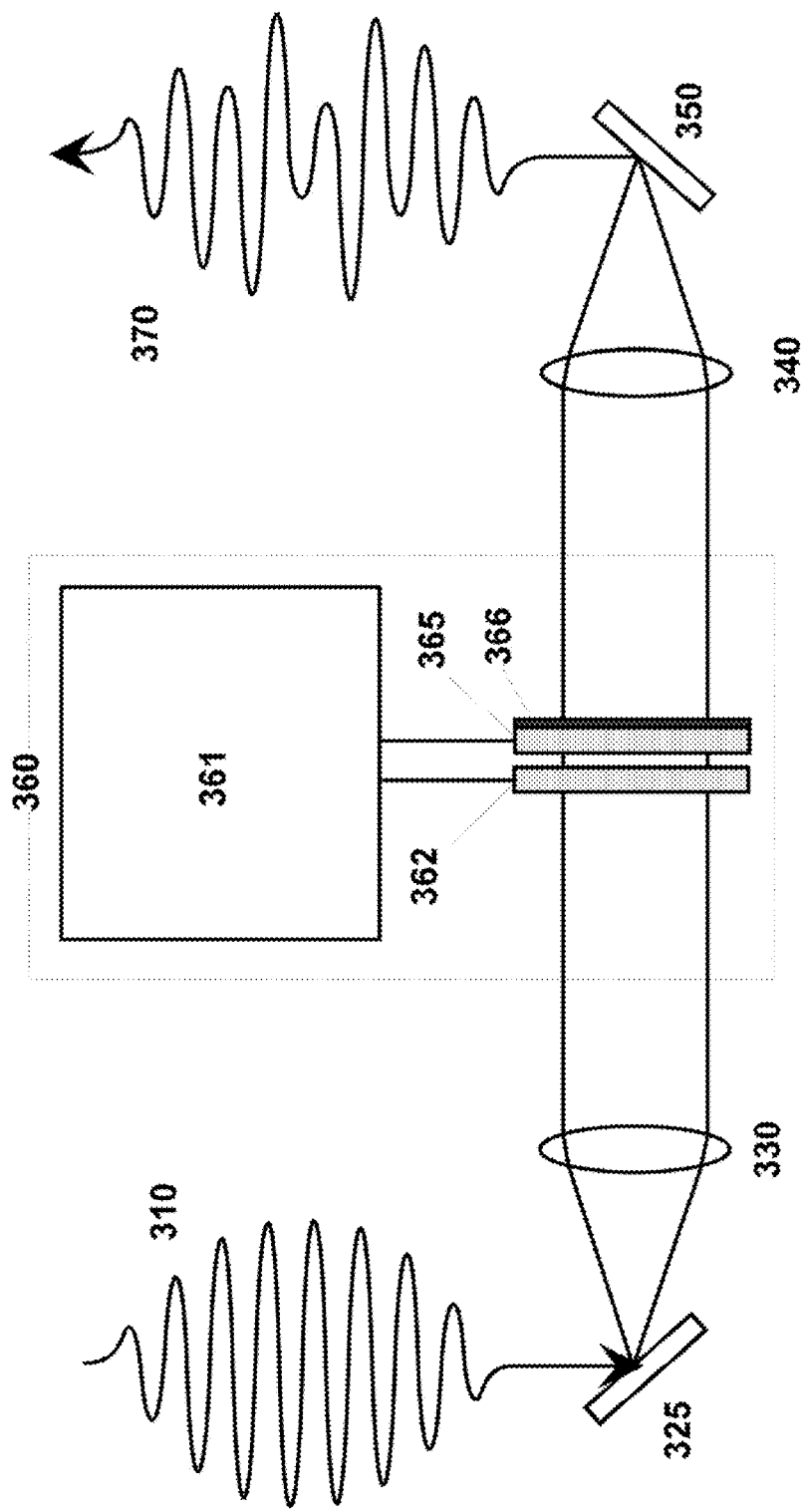
FIG. 3 Pulse shaper comprising a zero length pulse stretcher that transforms the pulse into frequency space (input diffraction grating, input lens, output lens and output diffraction grating. A spatial light modulator comprising a liquid crystal spatial light modulator.

The method of our invention (100) is provided as a schematic diagram in FIG. 1. Referring to FIGS. 1, 2 & 3, a closed loop feedback controller (110) provides to a pulse shaper a code for the setting of the numerous channels in the liquid crystal array. A fs laser pulse [310] passes through the pulse shaper whereby having its original pulse shape [310] altered to yield shaped laser pulse [370] which interacts with a substrate [125] generating nanoparticles [127]. The nanoparticle characteristics are measured [130] and compared [140] with the desired nanoparticle characteristics [150]. If the measured and desired characteristics are not equivalent [160], the closed loop feedback controller [110] provides the laser pulse shaper [112] with another (different and distinct) laser pulse shape and the process continues. When the measured nanoparticle characteristics [130] meet the desired nanoparticle characteristics [150] then the process has converged and a relationship [170] between the laser pulse shape [370] and the desired nanoparticles characteristics [150] is found. At convergence a relationship is developed between the desired nanoparticle characteristics [150] and the laser pulse shape [370]. The process can then produce nanoparticles of sufficient quantity using this pulse shape repetitively.

A catalog of all pulse shapes generated and the corresponding resulting nanoparticle characteristics is generated each time the processor cycles, whether or not the characteristics are desired. Such a database can be used in the development of other nanoparticles.

Details of the closed loop feedback controller [110] are provided in schematic form in (FIG. 2). Typically the closed loop feedback controller comprises a Ti:sapphire laser and associated amplifier [111] that produces high intensity fs laser pulses rich in spectral composition which are directed through the optical components of a laser pulse shaper [112]. The pulse shaper output (a shaped laser pulse [370]) is directed to interact [113] with the substrate [125] to produce nanoparticles [127]. The characteristics of the nanoparticles [130] are measured by one or more analyzers [114]. The signals from the analyzers [115] are read and interpreted by an algorithm which is running on a computer integral to the pulse shaper and closed loop feedback controller. The algorithm generates a new code for the setting of the numerous channels in the liquid crystal array whereby reconfiguring the pulse shaper so as to produce a new pulse shape. The process loop continues until a laser pulse shape is found that causes nanoparticles to be formed having the desired characteristics [150].

The term substrate is used here as the matter that is impinged upon by shaped fs laser pulses to form nanoparticles, such that the substrate plus the shaped laser pulse yield nanoparticles. The following descriptions of the substrate form are provided so that one skilled in the art may realize the utility of our invention. In one of many possible embodiments the substrate is a gas. The substrate can include such form as supersonic expansion of a gas through a nozzle. In another embodiment the substrate is a liquid. In yet another embodiment the substrate is solid. In a further embodiment the substrate can be a gas, liquid or gas in combination with one or more other gas, liquids or solids. Further gases, liquids or solids may be selected from any or in combination of a pure form, chemical compounds, alloys, mixtures or solution and in any combination thereof. A solid substrate may be in the form of a bulk solid or beam of particulate having dimensions smaller than the focus of the shaped laser pulse. For solid substrate/laser interactions, a thin, translating, rotating solid substrate sheet can be used. The use of sheets sufficiently thin to cause a hole to be formed in the sheet in a single laser shot can affect geometric configurations and characterization from all angles and to analyze the transmitted pulse.

Laser pulse shapers are commercially available, (Proteus Optics, Rose Valley, Pa.) and a description of the pathway the laser pulse takes through the pulse shaper is provided here (see also Levis 2002) to teach the manner in which the shape of a laser pulse may be altered. The description here nor the reference to any commercially available product is not meant to restrict the manner in which a pulse shape may be altered in this invention in any way. Rather, it is provided so that one trained in the art may benefit from its teaching and employ a pulse shaping method of their choosing. The laser pulse shaper [112] consists of a zero length stretcher which allows for the transformation of the laser pulse into frequency space. The laser pulse [310] impinges onto the input diffraction grating [325] which spatially separates the input pulse into its component frequencies, an input lens [330] columnates the spatially separated frequencies of the input pulse and directs it through a spatial light modulator [360] situated which consists of liquid crystal arrays [362] and [365] and associated polarizer [366] a computer controller (361) that directs the channels to modulate the passing of light through each of the 150-640 channels of which the liquid crystal array may be comprised. The altered spatially separated beam is now comprised of array of frequencies where some subset of which has been attenuated or phase shifted according to the code sent to the liquid crystal array from the computer. This altered beam is then focused by the output lens [340] onto an exit diffraction grating [350] where the spatially separated frequencies are reassembled into a "shaped' pulse [370].

Figure 4:
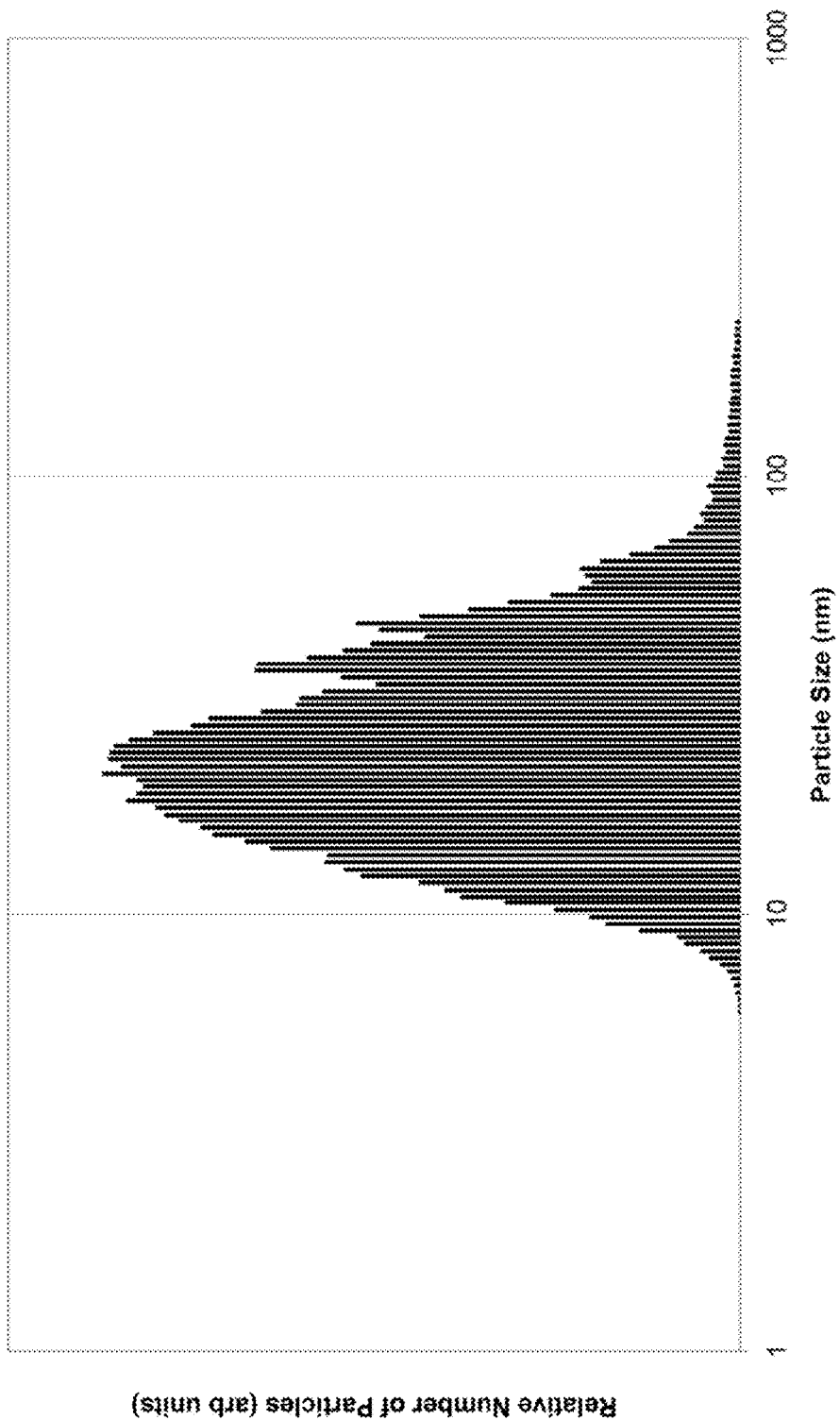
FIG. 4. Particle size distribution measurement relative number of particles (on the order of $10^4$ at maximum) vs. Particle size diameter (nm). Measurements were obtained for particle diameters between 5.0 and 230 nm only. The geometric mean diameter was 19.3 nm with a geometric standard deviation of 1.64.
Figure 5:
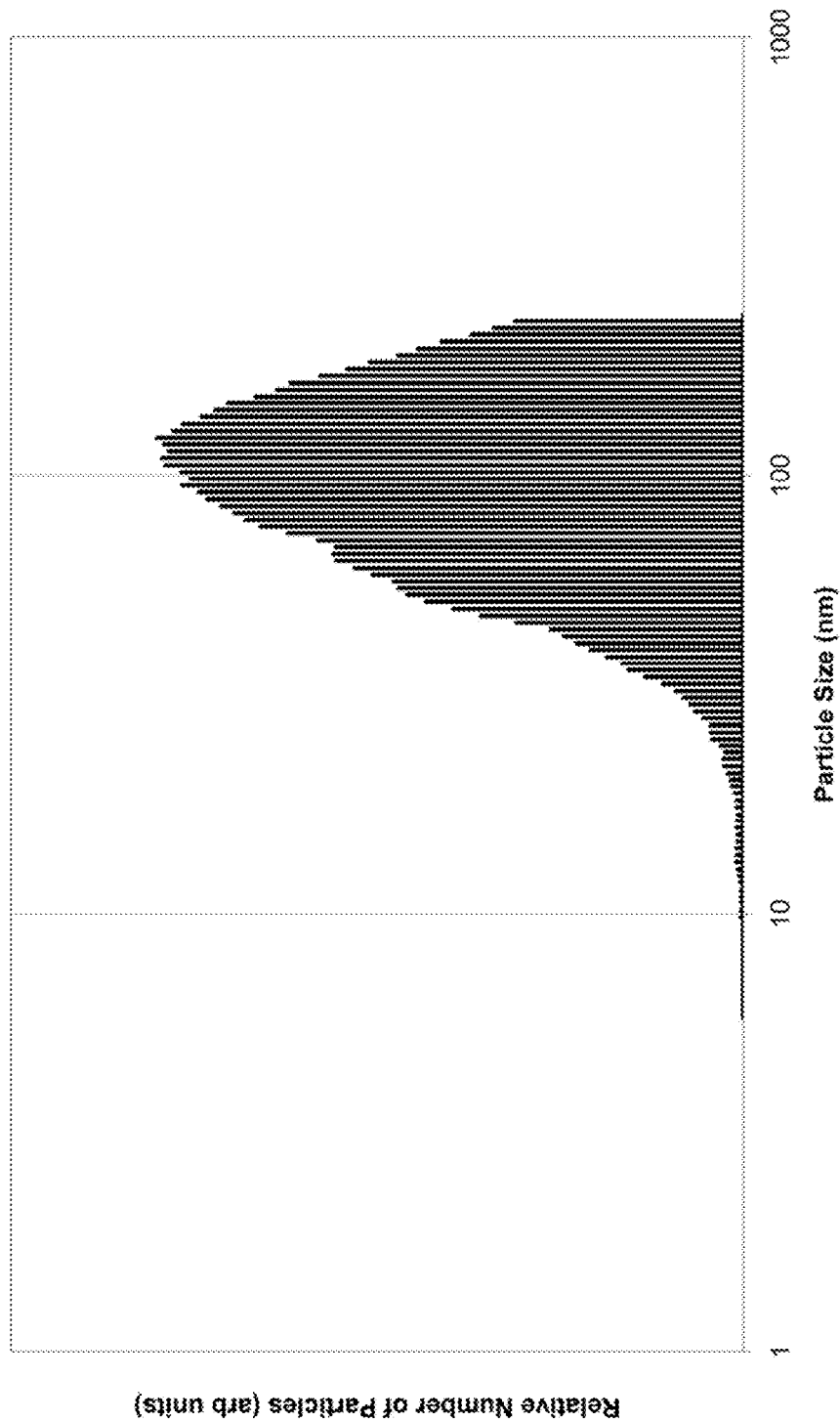
FIG. 5 Particle size distribution measurement relative number of particles (on the order of $10^4$ at maximum) vs. Particle size diameter (nm). Measurements was obtained for particle size diameters between 5.0 and 230 nm only. The geometric mean diameter were 86.2 nm with a geometric standard deviation of 1.78. The tail of the data was cut off at approximately 230 nm because the DMA was configured for a data collection range between 5 and 230 nm.

In one embodiment of our invention we constructed a fixture that allowed a fs pulse shaped laser beam to be directed onto the flat surface of a translating aluminum rod. While the laser pulsed the rod was repositioned to provide a fresh surface onto which the laser would impinge with each successive shot. A TSI Incorporated Scanning Mobility Particle Size Spectrometer (SMPSS) was attached to the port on the fixture 90 degrees off axis to the direction of the laser beam. Air was pulled through the orifice co-linear with the laser and drawn into and by the SMPSS internal pump. A typical experiment consisted of creating a laser pulse of random shape, repetitively directing it onto the aluminum surface repetitively until the particle size spectrum could be completed. The particle size distribution measurement took between 1 to 3 minutes depending on the length and resolution of the scan. Exemplary particle size distribution measurements shown in FIGS. 4 and 5 were obtained over a size range 5.9 to 230 nm with 64 channel resolution. Upon completion of one spectrum, another laser pulse was chosen and a new particle size measurement was initiated. In FIGS. 4 and 5 we provide two data sets that exemplified the results from two different pulse shape selections. The raw counts from both experiments had a maximum on the order of $10^4$. These results verified our invention allowed for the control of the average particle size by varying the shape of the fs laser pulse only. All other possible variables were held fixed. Using one laser pulse shape, we obtained a particle size distribution the geometric mean diameter was 19.3 nm with a geometric standard deviation of 1.64 (FIG. 4), and using another laser pulse shape a particle size distribution with a geometric mean diameter was 86.2 nm with a geometric standard deviation of 1.78 was obtained (FIG. 5). This data showed how different pulse shapes can create nanoparticles having very different particle size distributions. It further showed that control at the nanoscale is possible using variations in the makeup of the photonic reagent.

One embodiment our invention was comprised of a means for the manipulation of chemical reagents involved in nanoparticle formation, referred to as the substrate, and the nanoparticle products and provided a means for interaction with a fs laser beam with said substrate. Its description here is not intended to limit the invention but rather to teach the method by example. However, there exists a preponderance of arrangements of which may be arranged to allow shaped laser pulses operating in closed loop feedback control to affect the control of nanoparticle formation. The system is optically engineered to introduce shaped pulses with appropriate temporal and or spatial features to initiate nanoparticle formation. A means for the characterization of the nanoparticles in real time was provided. Such tools are chosen from the group of mass analyzers consisting of but not limited to a mass spectrometer and differential mobility analyzer. These examples of characterization tools are provided to give examples of what may be used to provide data on the characteristics of the nanoparticles to the control program and are not meant to limit the scope of the invention nor limit the multitude of possible methods that may be used. Specially designed software drivers that allow the various components of the system to interact, affect control and provide data acquisition and storage into a database are integrated into the invention. Many configurations exist in which one skilled in the art may structure or arrange such components to nanoparticle production and affect the control using shaped fs laser pulses described here.

In another example, the apparatus used to affect the interaction of the shaped fs laser pulses with the substrate consists of the shaped pulsed fs laser following a linear path, a substrate situated into the path, and associated control and data acquisition devices. The "apparatus" is a location where, or an object within which the laser pulses interact with the substrate. Ti also provides a means for the location of ports for the instrumentation for characterization, effectors for control of raw materials, temperature, flow and pressure control, electronics and ancillary controls as are needed to affect the process. The apparatus further may include a chamber for the nanoparticle synthesis that is compatible with existing equipment used for shaped pulse laser chemistry. The description of the use of a chamber within which nanoparticles are produced is not meant to limit our invention, but its description is included here with the intention of providing an example of one embodiment and not provided to limit the invention or restrict how the shaped laser pulses may be allowed to interact with a substrate to produce nanoparticles. The chamber in this embodiment contains the substrate in the laser path at a location where real-time particle size analysis, spectroscopic data is measured and particles for offline analysis may be collected and indexed to the particular laser pulse and the associates parameters used to produce them. The purpose of the chamber is to isolate the system from the environment in such cases where it would be desirable to isolate the nanoparticle production from the environment. The chamber may contain and collect the nanoparticle produced and hold effectors such as optical components and jigs for the positioning of components to allow one of many possible geometries between the shaped fs laser pulse path and the substrate.

Another example for gas phase experiments is provided. The substrate or reactant gas is admitted into the chamber either pure or diluted with an inert gas such as, but not limited to, helium or argon or any one or more of enumerable gases such as, but not limited to, hydrazine, oxygen, organometallic vapor or other vapors. The laser pulse is focused using a small numerical aperture and long focal length such that the intensity is constant or nearly constant over the interaction region and is on the order of $10^8$ to $10^{12}$ W cm$^3$ or $10^{13}$ W per cm$^3$ or as high or low as required to affect the desired result. The windows through which incident and emitted light passes are sufficiently far from the interaction region so as to avoid self phase modulation. The laser pulse substrate interaction creates a dispersion of nanoparticles from an illuminated cylinder on the order of 200 micro meters (one micro meter or "micron" $10^{-6}$ meters) in diameter and up to 1 cm long. Ancillary components are used so that nanoparticles produced are directed into the orifice of the sampling system for admission to the time of flight mass spectrometer (TOFMS) or other device such as but not limited to a differential mobility analyzer (DMA). These analytical tools provide real time particle size data as feedback for process control. The mass range on the TOFMS may be about $5 \times 10^5$ Da with a mass resolution of 1000 at $10^4$ Da or less. The interface to the TOFMS contains a capillary-based pressure sampling system and the requisite pumping to allow for high pressure to high vacuum coupling. A differential mobility analyzer (DMA) port may also be situated near the reaction zone to assay the products and provide feedback as to the particle size (mass) and distribution. A DMA system may operate at a longer time scale as compared to the TOFMS. In such a case the particular laser pulse is used repetitiously to produce nanoparticles representative of that particular laser pulse used, over a time period sufficient for DMA sampling to occur. A DMA may be used to validate the TOFMS measurements and provide independent verification of the presence of neutrals and positively and negatively charged particles. The DMA collects data over a size range between 2 and 1000 nm which corresponds to, in the case of Si for example, a range of 6000 to >$10^9$ Da and can be adjusted to provide a size resolution down to 1 nm. The TOFMS is configured to analyze positively or negatively charged particles. An external ionization source may be used to affect knowledge of the existence of neutral particles.

A means for collecting nanoparticles for off-line microscopic analysis and x-ray diffraction to verify the size, morphology and phase identification is situated in the vicinity of the region of laser substrate interaction. Other configurations are also possible, as one trained in the art of the design of such collection apparatuses will be able to accomplish. The means of collection consists of either a masked cold surface or a tape that allows for the momentary exposure and isolation of holey carbon copper grids to the plume backed by a low pressure source. Microscopic and x-ray analysis for particles produced from every laser shot is impractical, since the detailed examination of one sample using electron microscopy could take 1-3 hrs each. Samples collected for offline analysis are indexed to the laser shot data and all other process parameters.

Spectroscopic measurements such as but not limited to Raman, UV-vis absorption, fluorescence and four wave scattering measurements can be employed to affect characterization and provide feedback for control. If a chamber is used, these spectrospocopic tools can be used by directing their light paths through one or more windows of the chamber.

Extreme UV laser light scattering can also be used as a means to determine particle size, and synchrotron x-ray radiation can be used for time resolved phase development.

The feedback control loop consists of 1) the control processor operating one of several algorithms. 2) the spatial light modulator which shapes the fs laser pulse as directed by the control processor, 3) the location where the laser interacts with the substrate, and 4) the nanoparticle characterization process (TOFMS analyzer, DMA, etc.) that provides input to the control processor. A SEA TADPOLE system is capable of measuring extremely complex laser pulse shapes in real time. This important characterization tool is required to measure the actual temporal phase and envelope so that runs from day to day and month to month are directly comparable. The data from each laser shot, consisting of phase and amplitude masks, temporal pulse characterization and resulting nano-product size distribution are assembled into a data base for analysis. For spatial shaping, a Michelson interferometer can be used and overlap two beams to produce interference with maxima separated by any distance required.

In yet another example, the procedure for the production of nanoparticles involved the following. A gas substrate is placed into the chamber and conditions of thermal equilibrium and steady-state flow are established. Shaped fs laser pulses are directed into the interaction zone using the appropriate optical components. Under the direction of the algorithm, pulse shapes will be varied until the particle size and size distribution goals are achieved. Time-of-flight mass spectra are collected for each laser shot and analyzed in real time. The data is used in an algorithm to determine laser pulse shapes that drive higher fitness between the measured characteristics and the characteristic goals for the nanoparticle to be produced The pulse shape are optimized to yield a desired nanoparticle distribution as revealed by the mass spectrum and or other characterization techniques. Pulse shape for each shot are catalogued so that the entire process be repeated when necessary. The nanoparticle mass spectra are recorded as a function of laser pulse shape. Any optimization proceeds until the point in the process where a sample for off-line analysis is desired. At this point in the process the system can be directed to continuously fire the same laser pulse until the desired quantity of material is collected. The substrate will be refreshed in accordance with its type and the type of nanoparticles being produced.

According to another embodiment, a liquid stream substrate is placed into the chamber and conditions of thermal equilibrium and steady-state flow are established. Shaped fs laser pulses are directed into the interaction zone using the appropriate optical components. Under the direction of the algorithm, pulse shapes will be varied until the particle size and size distribution goals are achieved. Time-of-flight mass spectra are collected for each laser shot and analyzed in real time. The data is used in an algorithm to determine laser pulse shapes that drive higher fitness between the measured characteristics and the characteristic goals for the nanoparticle to be produced The pulse shape are optimized to yield a desired nanoparticle distribution as revealed by the mass spectrum and or other characterization techniques. The pulse shape for each shot are catalogued so that the entire process be repeated when necessary. The nanoparticle mass spectra are recorded as a function of laser pulse shape. Any optimization proceeds until the point in the process where a sample for off-line analysis is desired. At this point in the process, the system can directed to continuously fire the same laser pulse until the desired quantity of material is collected. The substrate will be refreshed in accordance with its type and the type of nanoparticles being produced.

According to yet another embodiment, a solid substrate is placed into the chamber and conditions of thermal equilibrium and steady-state flow are established. Shaped fs laser pulses are directed into the interaction zone using the appropriate optical components. Under the direction of the algorithm, pulse shapes will be varied until the particle size and size distribution goals are achieved. Time-of-flight mass spectra are collected for each laser shot and analyzed in real time. The data is used in an algorithm to determine laser pulse shapes that drive higher fitness between the measured characteristics and the characteristic goals for the nanoparticle to be produced The pulse shape is optimized to yield a desired nanoparticle distribution as revealed by the mass spectrum and or other characterization techniques. The pulse shape for each shot are catalogued so that the entire process be repeated when necessary. The nanoparticle mass spectra are recorded as a function of laser pulse shape. Any optimization proceeds until the point in the process where a sample for off-line analysis is desired. At this point in the process, the system can directed to continuously fire the same laser pulse until the desired quantity of material is collected. The substrate will be refreshed in accordance with its type and the type of nanoparticles being produced.

According to yet another embodiment combinations of one or more gas, liquid or solid substrates are placed into the chamber and conditions of thermal equilibrium and steady-state flow are established. Shaped fs laser pulses are directed into the interaction zone using the appropriate optical components. Under the direction of the algorithm, pulse shapes will be varied until the particle size and size distribution goals are achieved. Time-of-flight mass spectra are collected for each laser shot and analyzed in real time. The data is used in an algorithm to determine laser pulse shapes that drive higher fitness between the measured characteristics and the characteristic goals for the nanoparticle to be produced The pulse shape is optimized to yield a desired nanoparticle distribution as revealed by the mass spectrum and or other characterization techniques. The pulse shape for each shot are catalogued so that the entire process be repeated when necessary. The nanoparticle mass spectra are recorded as a function of laser pulse shape. Any optimization proceeds until the point in the process where a sample for off-line analysis is desired. At this point in the process the system can directed to continuously fire the same laser pulse until the desired quantity of material is collected. The substrate will be refreshed in accordance with its type and the type of nanoparticles being produced.

The system optimizes the laser pulse that yields particles of a particular size while recording all of the laser pulse shots and the associated mass spectra. When the specified size criteria is met the system can be directed to produce a new particle size.

The invention claimed is:

1. A method for the production of nanoparticles comprising the following:
   (a) creating a laser pulse of duration between 1 and 1000 fs;
   (b) shaping the laser pulse;
   (c) directing the laser pulse to interact with a substrate; and
   (d) causing nanoparticles to form.

2. The method of claim 1 where the said substrate is one or more from the group consisting of solids liquids and gases.

3. The method of claim 1 where the nanoparticle characteristics are modified by changing the shape of the laser pulses using information derived from the measurement of the characteristics of nanoparticles produced, the comparison of said measured characteristics to a set of desired characteristics and using the differences between said desired characteristics and said measured characteristics to affect the control of the laser pulse shape so as to cause said measured characteristics of the nanoparticles to become equivalent to the said desired characteristics.

4. A method for the production of nanoparticles comprising the following:
   (a) creating a laser pulse of duration between 1 and 1000 fs;
   (b) shaping the laser pulse;
   (c) directing the laser pulse to interact with a substrate;
   (d) causing nanoparticles to form;
   (e) analyzing properties of the nanoparticles; and
   (f) using said analysis in a feedback loop to affect the control of the nanoparticle characteristics.

5. The method of claim 4 where the said substrate is one or more from the group consisting of solids liquids and gases.

6. The method of claim 4 where said feedback loop to affect the control the nanoparticle characteristics comprises changing the shape of the laser pulses using information derived from the measurement of the characteristics of nanoparticles produced, the comparison of said measured characteristics to a set of desired characteristics and using the differences between said desired characteristics and said measured characteristics to affect the control of the laser pulse shape so as to cause said measured characteristics of the nanoparticles to become equivalent to the said desired characteristics.

7. An apparatus for the production of nanoparticles comprising:
   (a) a means for producing laser pulses;
   (b) a pulse shaper which is a means for shaping the laser pulses into fs laser pulses;
   (c) a means for introducing a substrate into a location;
   (d) a means for directing the fs shaped laser pulses into a location where they interact with a substrate to produce nanoparticles;
   (e) a means for analyzing the nanoparticles produced by the interaction of the said shaped fs laser pulse and the substrate produced at the said location;
   (f) a means for collecting the nanoparticles produced near said location;
   (g) a means for removing the nanoparticles from said location;
   (h) a means for affecting the characteristics of the nanoparticles using closed loop feedback control, where said closed loop feedback control consists of the measurement of the characteristics of nanoparticles produced, the comparison of said measured characteristics to a set of desired characteristics, the use of an algorithm to interpret the differences between said desired characteristics and said measured characteristics so as to direct the pulse shaper to modify the shape of successive laser pulse so as to modify the said measured characteristics of the successive nanoparticles produced such that said measured nanoparticle characteristics become equivalent to the said desired characteristics.

8. The method of claim 4, including providing means for affecting the characteristics of the nanoparticles using closed loop feedback control, and measuring with said closed loop feedback control consists of the measurement of the characteristics of nanoparticles produced, comparing said measured characteristics to a set of desired characteristics, interpreting the differences between said desired characteristics and said measured characteristics, and directing the pulse shaper to modify the shape of successive laser pulse so as to modify the said measured characteristics of the successive nanoparticles produced such that said measured nanoparticle characteristics become equivalent to the said desired characteristics.

9. The apparatus of claim 7 where the said substrate is one or more from the group consisting of solids liquids and gases.

10. The apparatus of claim 7, wherein the means for analyzing the nanoparticles produced at the location by the interaction of the said shaped fs laser pulse and the substrate comprises one or more from the group of time or flight mass spectrometer, differential mobility analysis, microscopic analysis, x-ray diffraction, spectroscopy including Raman, UV-vis absorption, fluorescence and four wave scattering measurements, extreme UV laser light scattering, and phase development using synchrotron x-ray radiation.

11. The apparatus of claim 7
   (a) wherein the means for affecting the characteristics of the nanoparticles includes a control processor operating one of several algorithms;
   (b) wherein said pulse shaper comprises a spatial light modulator which shapes the fs laser pulse as directed by the control processor;
   (c) the location where the laser interacts with the substrate;
   (d) a means of analysis that provides input to the control processor;
   (e) a means for measuring extremely complex laser pulse shapes in real time.

12. The apparatus of claim 7 where the pulse shaper which is a means for shaping the laser pulses includes control of the phase, amplitude and temporal pulse characteristics.

13. The apparatus of claim 7 where the means for producing laser pulses of claim 10 consists of Ti:sapphire laser for regenerative amplification of ultrashort pulses.

14. The apparatus of claim 7 where the pulse shaper which is a means for shaping the laser pulses is a light modulator.

15. A method of producing nanoparticles comprising:
   (a) placing a substrate into a location;
   (b) directing shaped fs laser pulses to interact with the substrate using optical components;
   (c) under the direction of an algorithm, fs laser pulse shapes are varied until the desired nanopowder particle size and size distribution are achieved;
   (d) size distribution data are collected for each laser shot and analyzed in real time;
   (e) size distribution data are used in an algorithm to determine laser pulse shapes that drive higher fitness between the measured nanopowder characteristics and the desired nanopowder characteristic goals;
   (f) optimizing the pulse shape to yield a desired nanoparticle size distribution as revealed by characterizing the size distribution of said nanoparticles produced by a said laser pulse shape.

16. The apparatus of claim 7, wherein said fs laser pulses have a pulse duration between $1 \times 10^{-15}$ s and $100 \times 10^{-15}$ s.

17. The method of claim 15, wherein characterizing the size distribution of said nanoparticles produced by a said laser pulse shape is carried out with a size distribution analyzer.

* * * * *